US012597262B2

(12) United States Patent　　　(10) Patent No.:　US 12,597,262 B2

Kuschk et al.　　　　　　　　　　　(45) Date of Patent:　　Apr. 7, 2026

(54) DETECTING AND IDENTIFYING OBJECTS REPRESENTED IN SENSOR DATA GENERATED BY MULTIPLE SENSOR SYSTEMS

(71) Applicant: GM Cruise Holdings LLC, San Francisco, CA (US)

(72) Inventors: Georg Kuschk, Garmisch-Partenkirchen (DE); Marc Unzueta Canals, Munich (DE); Sven Möller, Lübbecke (DE); Michael Meyer, Munich (DE); Karl-Heinz Krachenfels, Garmisch-Partenkirchen (DE)

(73) Assignee: GM Cruise Holdings LLC, San Francisco, CA (US)

( * ) Notice: Subject to any disclaimer, the term of this patent is extended or adjusted under 35 U.S.C. 154(b) by 0 days.

(21) Appl. No.: 17/899,734

(22) Filed: Aug. 31, 2022

(65) Prior Publication Data

US 2024/0020983 A1　　Jan. 18, 2024

(30) Foreign Application Priority Data

Jul. 13, 2022　(EP) ..................................... 22184764

(51) Int. Cl.
*G06V 20/56*　　　(2022.01)
*G01S 13/931*　　(2020.01)
*G01S 17/86*　　　(2020.01)
*G01S 17/931*　　(2020.01)

(52) U.S. Cl.
CPC ............ *G06V 20/56* (2022.01); *G01S 13/931* (2013.01); *G01S 17/86* (2020.01); *G01S 17/931* (2020.01)

(58) Field of Classification Search
CPC ...................................................... G01S 13/867
See application file for complete search history.

(56) References Cited

U.S. PATENT DOCUMENTS

| | | | | |
|---|---|---|---|---|
| 10,671,068 | B1 * | 6/2020 | Xu .......................... | G06N 20/10 |
| 11,921,824 | B1 * | 3/2024 | Hester .................... | G06N 3/045 |
| 2018/0136660 | A1 * | 5/2018 | Mudalige ............. | G05D 1/0214 |
| 2019/0265714 | A1 * | 8/2019 | Ball ...................... | G05D 1/0217 |
| 2020/0219264 | A1 * | 7/2020 | Brunner ............... | G01S 7/4808 |
| 2021/0103027 | A1 * | 4/2021 | Harrison ................. | G01S 7/40 |
| 2021/0241026 | A1 * | 8/2021 | Deng ...................... | G01S 7/497 |

(Continued)

FOREIGN PATENT DOCUMENTS

EP　　　　　4306999 A1　　1/2024

OTHER PUBLICATIONS

"Extended European Search Report for European Patent Application No. 22184764.3", Mailed Date: Jan. 11, 2023, 8 pages.

(Continued)

*Primary Examiner* — Frank Johnson
(74) *Attorney, Agent, or Firm* — Honigman LLP; Matthew H. Szalach; Jonathan P. O'Brien

(57)　　　　　　ABSTRACT

A system includes a first sensor system of a first modality and a second sensor system of a second modality. The system further includes a computing system that is configured to detect and identify objects represented in sensor signals output by the first and second sensor systems. The computing system employs a hierarchical arrangement of transformers to fuse features of first sensor data output by the first sensor system and second sensor data output by the second sensor system.

20 Claims, 4 Drawing Sheets

(56)         References Cited

U.S. PATENT DOCUMENTS

| | | | |
|---|---|---|---|
| 2022/0300831 A1* | 9/2022 | Friede .................... | G06N 3/091 |
| 2023/0206456 A1* | 6/2023 | Lee ...................... | G06V 10/764 |
| | | | 382/266 |
| 2025/0054286 A1* | 2/2025 | Huang ................... | G06V 20/58 |
| 2025/0156685 A1* | 5/2025 | Wu ........................ | G06N 3/045 |

OTHER PUBLICATIONS

"Response to the Communication Pursuant to Rule 69 EPC for European Patent Application No. 22184764.3", Filed Date: Feb. 2, 2024, 6 pages.

* cited by examiner

DETECTING AND IDENTIFYING OBJECTS REPRESENTED IN SENSOR DATA GENERATED BY MULTIPLE SENSOR SYSTEMS

RELATED APPLICATION

This application claims priority to European Patent Application No. 22184764.3, filed on Jul. 13, 2022, and entitled "DETECTING AND IDENTIFYING OBJECTS REPRESENTED IN SENSOR DATA GENERATED BY MULTIPLE SENSOR SYSTEMS". The entirety of this application is incorporated herein by reference.

BACKGROUND

With respect to some object detection systems that are employed to identify and track objects based upon output of sensor signals, such systems are configured to detect and identify objects based upon a fusion of sensor signals generated by different sensors; however, fusing some types of sensor data may result in loss of information in the resultant fused data.

For instance, a system may include a radar sensor and a camera, where radar data generated by the radar system is in three-dimensional space and image data generated by the camera is in two-dimensional space. Fusing the radar data with the image data, conventionally, has resulted in loss of information. More specifically, when fusing the radar data with the image data includes projecting the radar data into two-dimensional space, the strength of size invariance is lost as multiple points from the 3D space may be mapped to a single point in the 2D image space. Likewise, when fusing the radar data with the image data includes projecting the image data into three-dimensional space, image details may be lost and/or distorted due to depth ambiguity. Moreover, fusing sensor data from several sensors of the same type results in loss of information; for example, fusing image data generated by different cameras (located at different positions) by projecting the image data into a common coordinate system results in loss of information due to the native coordinate systems of the different cameras not overlapping with one another. Accordingly, the object detection system may receive suboptimal fused data, which can impact accuracy of object detection and identification.

SUMMARY

The following is a brief summary of subject matter that is described in greater detail herein. This summary is not intended to be limiting as to scope of the claims.

Various technologies relating to object detection and identification are described herein. A system, such as an autonomous vehicle (AV), a drone, an airplane, a security system, or the like, includes a plurality of sensor systems configured to generate a plurality of sensor signals indicative of an environment of the system. Depending on the type and configuration of each sensor system, the sensor signals generated may be output in disparate modalities. An exemplary system has a first sensor system and a second sensor system, where the first sensor system is configured to generate and output sensor signals in first modality, and further where the second sensor system is configured to generate and output a plurality of sensor signals in a second modality. For instance, the first sensor system is a camera configured to generate two-dimensional images, and the second sensor system is a radar system or a lidar system configured to generate point clouds.

The system further includes a computing system that executes an object detection system, where the object detection system includes three transformers: a first transformer that predicts existence of objects in an environment of the system based upon first sensor data generated by the first sensor system; a second transformer that predicts existence of objects in the environment of the system based upon sensor data generated by the second sensor system; and a third transformer that predicts existence of objects based upon combined output of the first transformer and the second transformer.

More specifically, the object detection system includes a first transformer module and a second transformer module, where the first transformer module comprises a first feature extractor module, a first positional encoder, and the first transformer. Similarly, the second transformer module comprises a second feature extractor module, a second positional encoder, and the second transformer.

In operation, the first feature extractor module receives first sensor data (e.g., an image) generated by the first sensor and extracts first features therefrom, and the first positional encoder assigns respective positional encodings to the first features. The first transformer is pre-trained to predict existence of objects in the environment of the system based upon features extracted by the first feature extractor module and corresponding positional encodings. Accordingly, the first transformer outputs first vectors, with each vector in the first vectors corresponding to a respective region (e.g., a box) in the first sensor data (e.g., the image), and further where each vector in the first vectors indicates a type of object predicted as being included in the region (e.g., "no object", "car", "pedestrian", "bike", etc.). In parallel, the second feature extractor module receives second sensor data (e.g., a point cloud) generated by the second sensor and extracts second features therefrom, and the second positional encoder assigns respective positional encodings to the second features. The second transformer is pre-trained to predict existence of objects in the environment of the system based upon features extracted by the second feature extractor module and corresponding positional encodings. Thus, the second transformer outputs a second vectors, with each vector in the second vectors corresponding to a respective region (e.g., a region in "birds eye view") in the second sensor data (e.g., the point cloud), and further where each vector in the second vectors indicates a type of object predicted as being included in the region.

The third transformer module is pre-trained to identify objects in the environment of the system based upon vectors output by the first transformer and vectors output by the second transformer. Continuing with the example set forth above, the third transformer receives the first vectors and the second vectors as input, and outputs third vectors, where each vector in the third vectors corresponds to a region in the environment of the system, and further where each vector in the third vectors indicates a type of object predicted as being included in the region in the environment of the system. Effectively, the third transformer, during training, learns a bipartite correlation between sensor modalities, including between features and geometric relations of objects with respect to each other. It is noted that the technologies described herein do not rely upon an explicit projection of sensor data from one modality to another, and thus the technologies described herein address the problem of loss of information described above. Furthermore, the technologies described herein are associated with improved recall in comparison to conventional approaches that rely on projections of sensor data from one space to another to perform object detection and identification. For example, if a small object in the environment of a system is not represented in radar data, but the same object is readily ascertainable in a corresponding image, the third transformer can nevertheless detect and identify range of the object from the system because of the fusion of outputs of the first transformer and the second transformer. Similarly, when a first object is partially occluded by a second object in an image, the third transformer can nevertheless distinguish between the first object and the second object and determine ranges to those objects.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
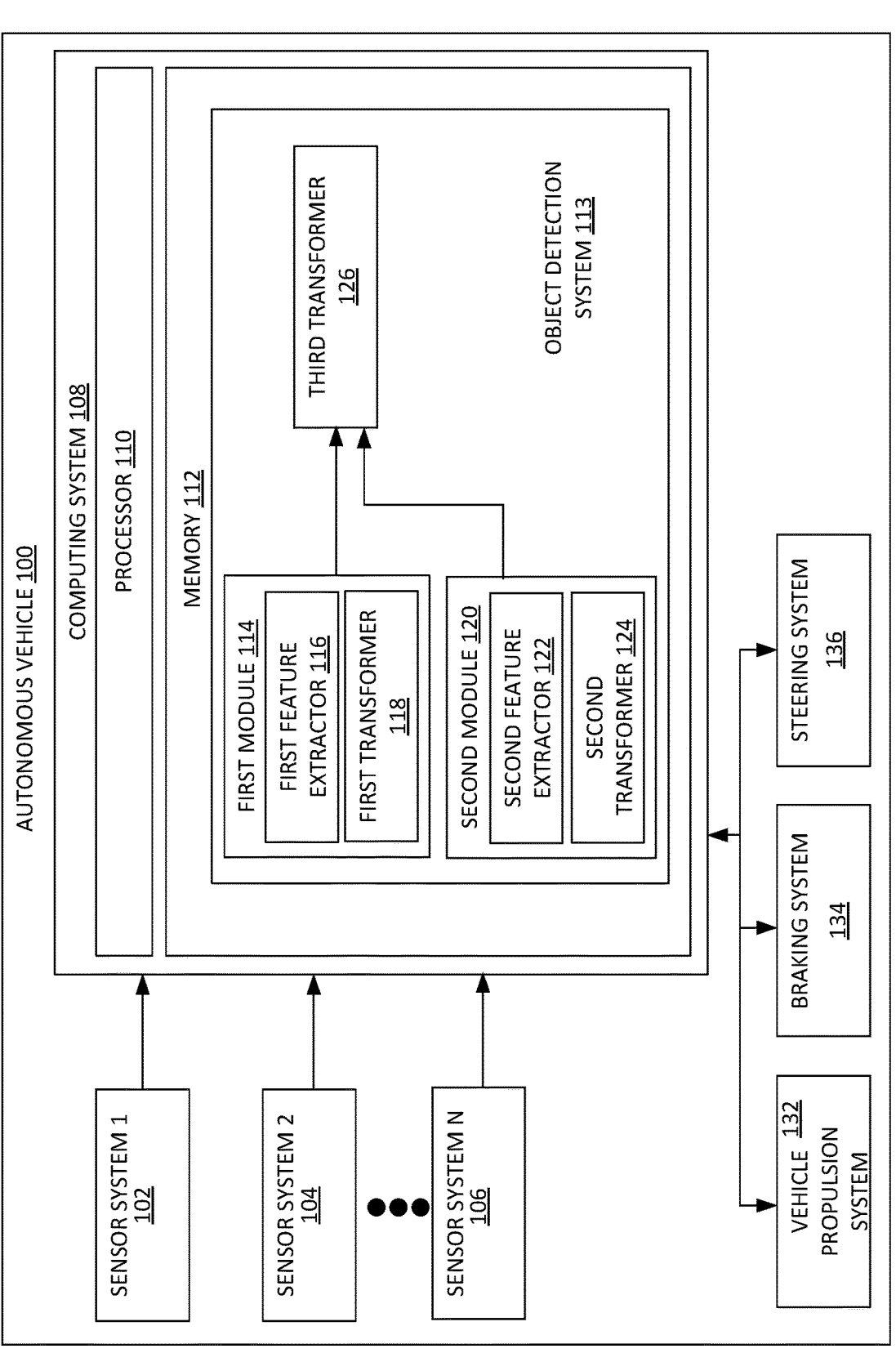
FIG. 1 is a schematic that illustrates an autonomous vehicle (AV) that includes a plurality of sensor systems, where data generated by the sensor systems are provided to an object detection module that is configured to detect and identify objects in an environment of the AV, and further where the object detection system includes a hierarchical arrangement of transformers.

Various technologies pertaining to detecting and identifying objects in an environment of a system, such as an autonomous vehicle (AV), an aircraft (such as a drone or airplane), watercraft, a security system, etc., where the objects are detected and identified based upon output of sensor systems of different modalities are now described with reference to the drawings, where like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system modules may be performed by multiple modules. Similarly, for instance, a module may be configured to perform functionality that is described as being carried out by multiple modules.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Described herein are various technologies pertaining to object detection and identification by a system, wherein a hierarchical arrangement of transformers is employed to detect and identify objects in the environment of the system based upon sensor systems of different modalities. The system includes a first sensor system and a second sensor system, where the first sensor system is of a first modality (e.g., a camera that outputs images) and the second sensor system is of a second modality (e.g., a radar system or lidar system that outputs point clouds).

The system further includes an object detection system, where the object detection system includes a hierarchical arrangement of transformers. Specifically, and as will be described in greater detail herein, the transformers comprise a first transformer, a second transformer, and a third transformer. Briefly, the first transformer is configured to generate first output based upon first sensor data generated by the first sensor system, and the second transformer is configured to generate second output based upon second sensor data generated by the second sensor system. The third transformer is configured to receive the first output and the second output and is further configured to generate third output based upon the first output and the second output. The third output comprises identities of objects in the environment of the system and corresponding locations of the objects relative to the system. The system can autonomously perform some task based upon the third output. Tasks may include performing a driving maneuver, an aerial maneuver, a water-based maneuver, generating an alert, and so forth.

The first output comprises identities of objects and their corresponding locations in the first sensor data (as computed by the first transformer), and the second output comprises identities of objects and their corresponding locations in the second sensor data (as computed by the second transformer). Hence, the third output is not dependent upon a projection of sensor data from one modality to another modality, and accordingly the technologies described herein are not deleteriously impacted by loss of information that occurs when sensor data is projected from one space to another.

The object detection and identification technologies described herein exhibit several advantages over conventional technologies for object detection and identification. For example, the object detection technologies described herein do not rely upon projection of sensor data from one modality to another (e.g., a point cloud is not projected onto an image and an image is not projected onto a point cloud). Further, the object detection technologies described herein are associated with improved recall when compared to recall of conventional technologies. Moreover, upon being trained, the object detection system learns bipartite matching between sensor modalities, including features and geometric relations of objects with respect to one another.

Examples set forth herein pertain to an AV including sensor systems and a computing system, where the computing system performs sensor fusion based upon sensor signals output by the sensor systems. It is to be understood, however, that the technologies described herein are well-suited for variety of different scenarios, such as flight, in drone technologies, in monitoring technologies (e.g., security technologies), in watercraft technologies, and so forth. AVs are set forth herein as one possible use case, and features of the claims are not to be limited to AVs unless such claims explicitly recite an AV.

Referring now to FIG. 1, an AV 100 is illustrated. In certain embodiments, the AV 100 is a level 5 fully autonomous AV. While an AV is described herein with reference to an autonomous automobile, it is to be understood that the AV 100 may be a truck, a motorcycle, a ground-based drone, or other suitable AV.

The AV 100 comprises a plurality of sensor systems 102-106, including a first sensor system 102 and a second sensor system 104. It is appreciated that the AV 100 may comprise additional sensor systems, illustrated here as sensor system N 106. It is appreciated that sensor systems as disclosed herein may comprise a camera system, a radar sensor system, a lidar sensor system, an ultra-sonic sensor system, an infrared sensor system, a global positioning system (GPS), an accelerometer, and/or other suitable sensor systems. The sensor systems are configured to generate sensor output indicative of the operational environment of AV 100. In an example, the first sensor system 102 and the second sensor system 104 may be of different modalities. For instance, the first sensor system 102 is a camera system that is configured to generate sensor output in the form of images in a first two-dimensional (2D) plane (e.g., X,Y), whereas the second sensor system 104 is a radar sensor system that is configured to generate sensor output in a second 2D plane that is approximately orthogonal to the first 2D plane (e.g., X,Z). Conventionally, to provide both data output by the first sensor system 102 and data output by the second sensor system 104 to an object detection system, data of one of the sensor systems is projected into space of the other sensor system. For instance, data in the X,Y plane (output by the camera system) is projected into the X,Z plane. As will be described in greater detail below, the technologies described herein do not require explicit projection of sensor data from one space to another.

The plurality of sensor systems 102-106 generate and output a plurality of sensor signals. The AV 100 further includes a computing system 108 that is in communication with the sensor systems 102-106, where the computing system 108 receives sensor signals output by the sensor systems 102-106. The computing system 108 comprises a processor 110 and memory 112, where the memory 112 includes instructions that are executed by the processor 110. Pursuant to various examples, the processor 110 can be or include a graphics processing unit (GPU), a plurality of GPUs, a central processing unit (CPU), a plurality of CPUs, an application-specific integrated circuit (ASIC), a microcontroller, a programmable logic controller (PLC), a field programmable gate array (FPGA), or the like.

As illustrated in FIG. 1, the memory 112 includes an object detection system 113 that receives a first sensor signal output by the first sensor system 102 and a second sensor signal output by the second sensor system 104, where the first sensor signal and the second sensor signal correspond in time to one another. For example, the first sensor signal is an image and the second sensor signal is a point cloud, where the image and the point cloud are output by the first sensor system 102 and the second sensor system 104 at approximately the same time. The object detection system 113 is configured to detect and identify objects in the environment of the AV 100 based upon the first sensor signal and the second sensor signal.

AV 100 further comprises several mechanical systems that are used to effectuate appropriate motion of the AV 100. For instance, the mechanical systems can include, but are not limited to, a vehicle propulsion system 132, a braking system 134, and a steering system 136. The vehicle propulsion system 132 can be an electric motor, an internal combustion engine, or a combination thereof. The braking system 134 can include an engine brake, brake pads, actuators, and/or any other suitable componentry that is configured to assist in decelerating the AV 100. The steering system 136 includes suitable componentry that is configured to control the direction of movement of the AV 100. While not illustrated, the memory can include a control module that receives output of the object detection system 113, where the control module controls at least one of the mechanical systems based upon the output of the object detection system 113 (e.g., one or more objects detected and identified by the object detection system 113).

Additional detail pertaining to the object detection system 113 is now set forth. The object detection system 113 includes a first module 114, where the first module 114 includes a first feature extractor 116 and a first transformer 118. The first module 114 is configured to receive output of the first sensor system 102 and generate first output based upon the output of the sensor system 102. The object detection system 113 also includes a second module 120, where the second module 120 includes a second feature extractor 122 and a second transformer 124. The second module 120 is configured to receive output of the second sensor system 104 and generate second output based upon the output of the second sensor system 104. The object detection system 113 further includes a third transformer 126 that is in communication with the first module 114 and the second module 120. The third transformer 126 is configured to receive the first output generated by the first module 114 and the second output generated by the second module 120 and is further configured to generate third output based upon the first output and the second output. The third output includes identities of objects that are in the environment of the AV 100, and optionally includes information indicative of positions of the objects in the environment of the AV 100.

Operation of the object detection system 113 is now described. The first feature extractor of the first module 114 receives output of the first sensor system 102, wherein the output can be an image. The first feature extractor 116 extracts first features from the image, where the first features may be indicative of objects in the environment of the AV 100. In an example, the first feature extractor 116 can be a neural network, such as a residual neural network. The first transformer 118 receives the first features and positional encodings related to the first features as input, and the first transformer 118 outputs first vectors based upon the first features and the positional encodings. In an example, the first transformer 118 outputs a predefined number of first vectors. The first vectors include identities of objects determined to be represented in the image by the first transformer 118 and information indicative of locations of such objects in the image. Example identities include "car", "truck", "bike", "pedestrian", and so forth. Further, the identities can include "no object". Hence, the first transformer 118 has been trained to identify objects in images and their locations in the images.

In parallel with the first module 114 operating on the output of the first sensor system 102, the second feature extractor 122 of the second module 120 receives output of the second sensor system 104, where the output can be a point cloud. The second feature extractor 122 extracts second features from the point cloud, where the second features may be indicative of objects in the environment of the AV 100. In an example, the second feature extractor 122 can be a neural network, such as a residual neural network. The second transformer 124 receives the second features and positional encodings related to the second features as input, and the second transformer 124 outputs second vectors based upon the second features and the positional encodings. In an example, the second transformer 124 outputs the predefined number of vectors (the same number of vectors as output by the first transformer 118). The second vectors include identities of objects determined to be represented in the point cloud by the second transformer 118 and information indicative of locations of such objects in the point cloud. As noted above, example identities include "car", "truck", "bike", "pedestrian", and so forth. Further, the identities can include "no object". Hence, the second transformer 124 has been trained to identify objects in point clouds and their locations in the point clouds. While images and point clouds have been set forth as an example, it is to be understood that features described herein are applicable to sensor systems of other modalities.

The third transformer 126 receives the first vectors and the second vectors as input and generates third vectors based upon the first vectors and the second vectors. The third vectors include identities of objects determined to be represented in the image and/or the point cloud by the third transformer 126 and information indicative of locations of such objects relative to the AV 100. For instance, the location information can be in the domain of the point cloud. Accordingly, the third transformer 126 has been trained to detect and identify objects in the environment of the AV 100 based upon outputs of the first transformer 118 and the second transformer 124.

From the foregoing, it can be ascertained that the object detection system 113 detects and identifies objects in an environment of the AV 100 based upon sensor data of multiple different modalities; however, sensor data of one modality is not explicitly projected into the space of another of the modalities. In summary, then, the object detection system 113 comprises two transformer modules 114 and 120, one for a first modality (e.g., camera) and a second modality (e.g., radar or lidar), respectively. The transformer modules 114 and 120 include transformers 118 and 124, with each transformer including an encoder and a decoder, and where input to a transformer includes feature patches obtained by a feature extraction module combined with positional encoding.

Output features of the two modules are combined in the third transformer module 126, where the features for objects identified by the transformer modules 114 and 120 are fused. Any sort of explicit projection is avoided. The object detection system 113 learns the bipartite matching between modalities, where the bipartite matching includes both features and geometrical relations of objects with respect to each other. Accordingly, the object detection system 113 achieves a globally consistent fusion. The way that the fusion internally works is that the third transformer 126 correlates objects in different modalities (through cross attention in a decoder of the third transformer 126), and then asserts that the relationships of these objects are consistent with each other (through self-attention in the decoder of the third transformer 126). An example is an object A that is occluded in an image by object B should be further way than object B in a birds-eye view space.

Figure 2:
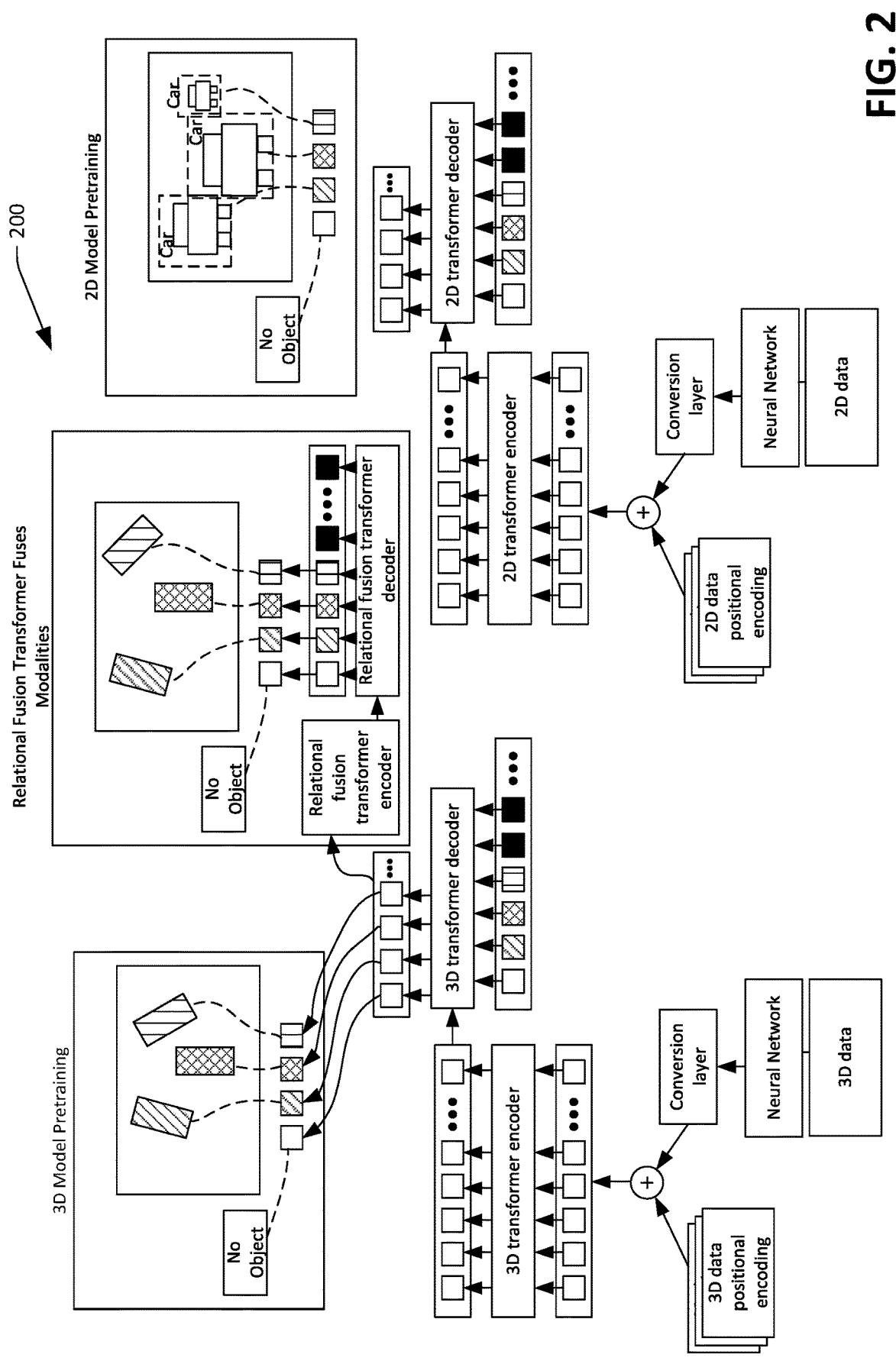
FIG. 2 is a schematic that illustrates data flow through an object detection system.

FIG. 2 is a schematic that illustrates flow of data through the object detection system 113 as well as training of the transformers 118, 124, and 126 of the object detection system. As illustrated in FIG. 2, the decoder of the first transformer 118 is trained based upon several labeled camera images, such that the first transformer 118 can output predictions for objects represented in image data. Additionally, the decoder of the second transformer 124 is trained based upon several labeled point clouds from a radar or lidar system, such that the second transformer 124 can output predictions for objects represented in camera or lidar data. The third transformer 126 is trained based upon outputs of the first transformer 118 and the second transformer 124, as well as labeled objects represented in the underlying sensor data. During operation, output of the second transformer 124 is provided to the encoder of the third transformer 126, while output of the first transformer 118 is provided to the decoder of the third transformer 126. The decoder of the third transformer can output predictions of objects in the domain of the radar or lidar sensor.

Figure 3:
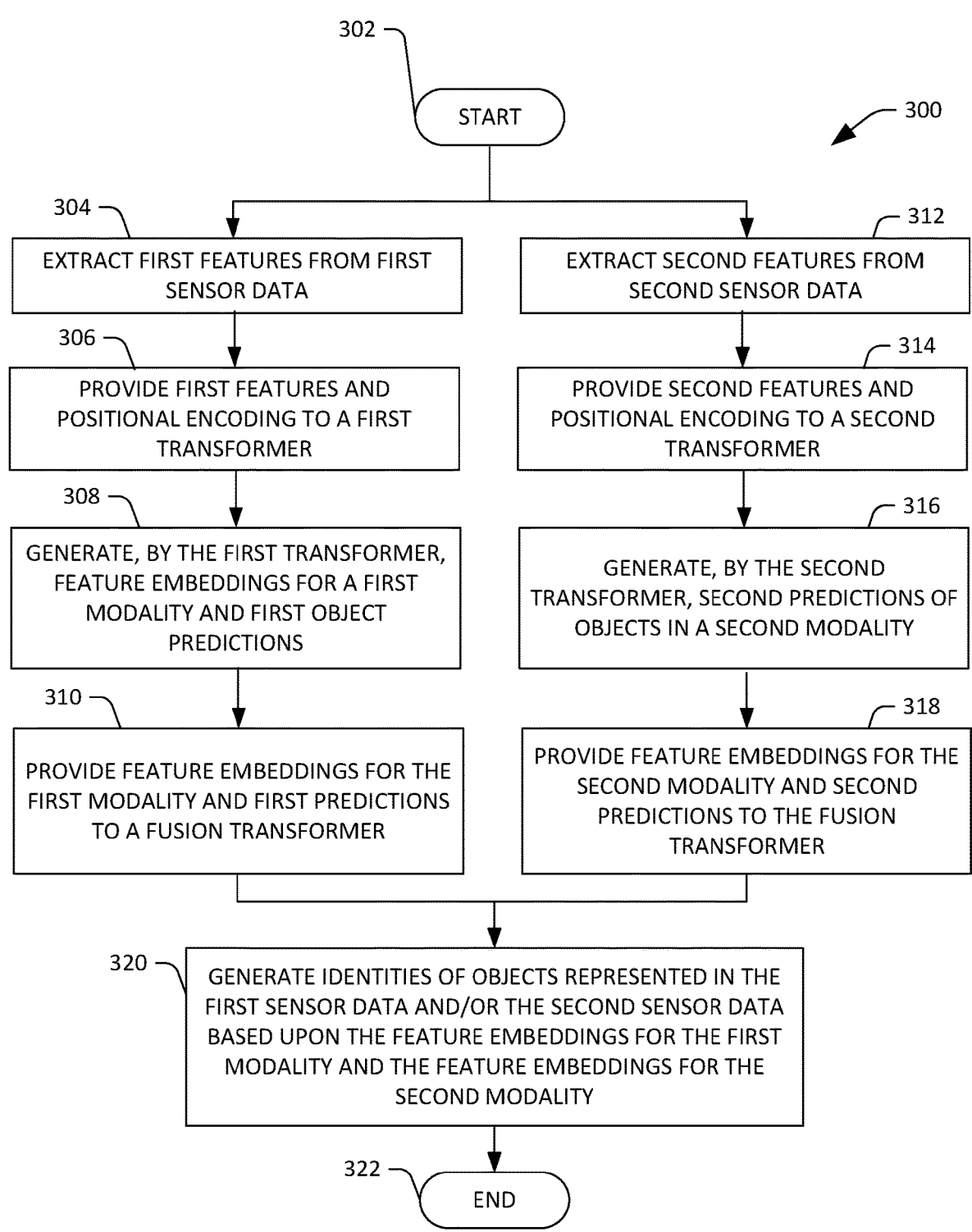
FIG. 3 is a flow diagram illustrating a methodology for detecting and identifying objects in an environment of a system through use of a hierarchical arrangement of transformers.

FIG. 3 illustrates an exemplary methodology 300 for multi-modal object detection. While the methodology is shown as being a series of acts that are performed in a sequence, it is to be understood and appreciated that the methodology is not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium displayed on a display device, and/or the like.

FIG. 3 depicts an exemplary methodology 300 for identifying objects in an environment of a system. The methodology 300 starts at 302, and at 304, first features are extracted from first sensor data output by a first sensor system. As indicated above, the first sensor system can be a camera. At 306, the first features and positional encodings corresponding thereto are provided as input to a first transformer. At 308, the first transformer generates feature embeddings for a first modality and first predictions for objects represented in the first sensor data. At 310, the feature embeddings for the first modality and the first predictions are provided as input to a fusion transformer.

In parallel with acts 302-310, acts 312-318 are performed. At 312, second features are extracted from second sensor data output by a second sensor system. The second sensor system can be a radar system or a lidar system. At 314, the second features and positional encodings corresponding thereto are provided as input to the second transformer. At 316, the second transformer generates feature embeddings for a second modality and second predictions for objects represented in the second sensor data. At 318, the feature embeddings for the second modality and the second predictions are provided as input to the fusion transformer.

At 320, the fusion transformer outputs identities of objects represented in the first sensor data and/or the second sensor data based upon the feature embeddings for the first modality and the feature embeddings for the second modality. The methodology 300 completes at 322.

Figure 4:
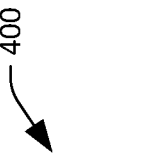
FIG. 4 is an example computing system.
Figure 4:
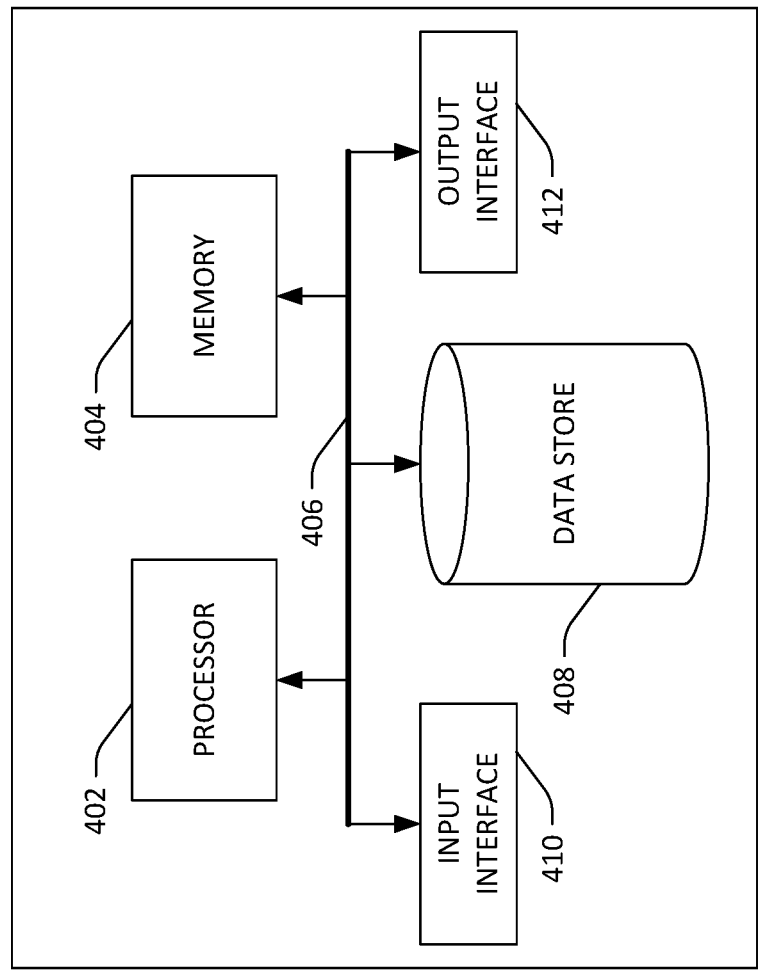

Referring now to FIG. 4, a high-level illustration of a computing device 400 that can be used in accordance with the systems and methodologies disclosed herein is illustrated. For instance, the computing device 400 may be used in a system that is configured to perform multi-modal object detection according to the present disclosure. The computing device 400 includes at least one processor 402 that executes instructions that are stored in a memory 404. The processor 402 may be a central processing unit (CPU), a graphical processing unit (GPU), a field programmable gate array (FPGA), or any suitable combination of such computing devices. The instructions may be, for instance, instructions for implementing functionality described as being carried out by one or more components discussed above or instructions for implementing one or more of the methods described above. The processor 402 may access the memory 404 by way of a system bus 406. In addition to storing executable instructions, the memory 404 may also store sensor data, data tensors, extracted feature values, images, positional encodings, etc.

The computing device 400 additionally includes a data store 408 that is accessible by the processor 402 by way of the system bus 406. The data store 408 may include executable instructions, sensor data, data tensors, extracted feature values, images, positional encodings, etc.

The computing device 400 also includes an input interface 410 that allows external devices to communicate with the computing device 400. For instance, the input interface 410 may be used to receive instructions from an external computer device, from a user, etc. The computing device 400 also includes an output interface 412 that interfaces the computing device 400 with one or more external devices. For example, the computing device 400 may display text, images, etc. by way of the output interface 412.

Additionally, while illustrated as a single system, it is to be understood that the computing device 400 may be a distributed system. Thus, for instance, several devices may be in communication by way of a network connection and may collectively perform tasks described as being performed by the computing device 400.

Described herein are systems and methods according to the following examples.

(A1) In an aspect, a method performed by a computing system is disclosed herein, where the method includes generating, by a first transformer, first output based upon first sensor data generated by a first sensor system, where the first output comprises identities of objects determined by the first transformer to be represented in the first sensor data. The method also includes generating, by a second transformer, second output based upon second sensor data generated by a second sensor system, where the second output includes identities of objects determined by the second transformer to be represented in the second sensor data. The method also includes generating, by a third transformer, third output based upon the first output and the second output, where the third output comprises identities of objects determined by the third transformer to be in an environment of the computing system.

(A2) In some embodiments of the method of (A1), the third output further comprises locations of the identified objects.

(A3) In some embodiments of at least one of the methods of (A1)-(A2), the first sensor system is a camera and the second sensor system is radar sensor system.

(A4) In some embodiments of at least one of the methods of (A1)-(A2), at least one of the first sensor system or the second sensor system is a lidar system.

(A5) In some embodiments of at least one of the methods of (A1)-(A4), the method also includes extracting features from the first sensor data and providing the features and positional encodings to the first transformer, wherein the first transformer generates the first output based upon the extracted features and the positional encodings.

(A6) In some embodiments of the method of (A5), the method also includes extracting second features from the second sensor data and providing the second features and second positional encodings to the second transformer, wherein the second transformer generates the second output based upon the extracted second features and the second positional encodings.

(A7) In some embodiments of at least one of the methods of (A1)-(A6), the first sensor data is an image and the second sensor data is a point cloud.

(B1) In another aspect, a method performed by a computing system is disclosed herein, where the method includes generating, by a first transformer, first output based upon first sensor data generated by a first sensor system, wherein the first output comprises identities of objects determined by the first transformer to be represented in the first sensor data, and further wherein the first sensor data is in a first modality. The method also includes generating, by a second transformer, second output based upon second sensor data generated by a second sensor system, wherein the second output comprises identities of objects determined by the second transformer to be represented in the second sensor data, and further wherein the second sensor data is in a second modality. The method also includes generating, by a third transformer, third output based upon the first output and the second output, wherein the third output comprises identities of objects determined by the third transformer to be in an environment of the computing system.

(B2) In some embodiments of the method of (B1), the third output further comprises locations of the identified objects.

(B3) In some embodiments of at least one of the methods of (B1)-(B2), the first sensor system is a camera and the second sensor system is radar sensor system.

(B4) In some embodiments of at least one of the methods of (B1)-(B2), at least one of the first sensor system or the second sensor system is a lidar system.

(B5) In some embodiments of at least one of the methods of (B1)-(B4), the method also includes extracting features from the first sensor data and providing the features and positional encodings to the first transformer, wherein the first transformer generates the first output based upon the extracted features and the positional encodings.

(B6) In some embodiments of at least one of the methods of (B5), the method also includes extracting second features from the second sensor data and providing the second features and second positional encodings to the second transformer, wherein the second transformer generates the second output based upon the extracted second features and the second positional encodings.

(B7) In some embodiments of at least one of the methods of (B1)-(B6), the first sensor data is an image and the second sensor data is a point cloud.

(C1) In yet another aspect, a system is described herein, where the system includes a first sensor system that generates first sensor data, the first sensor data corresponding to a first modality. The system also includes a second sensor system that generates second sensor data, the second sensor data corresponding to a second modality. The system additionally includes a computing system that is in communication with the first sensor system and the second sensor system, where the computing system includes a processor and memory that stores computer-executable instructions that, when executed by the processor, cause the processor to perform any of the methods disclosed herein (e.g., any of the methods of (A1)-(A7) and (B1)-(B7)).

(D1) In still yet another aspect, a computer-readable storage medium is disclosed herein, where the computer-readable storage medium includes instructions that, when executed by a processor, cause the processor to perform any of the methods described herein (e.g., any of the methods of (A1)-(A7) and (B1)-(B7)).

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A system comprising:
a first sensor system that generates first sensor data, the first sensor data corresponding to a first modality;
a second sensor system that generates second sensor data, the second sensor data corresponding to a second modality;
a computing system that is in communication with the first sensor system and the second sensor system, wherein the computing system comprises:
a processor; and
memory that stores computer-executable instructions that, when executed by the processor, cause the processor to perform acts comprising:
generating, by a first transformer, a first output based upon the first sensor data, wherein the first output comprises identities of objects determined by the first transformer to be represented in the first sensor data and corresponding locations of the objects in the first sensor data;
generating, by a second transformer, a second output based upon the second sensor data, wherein the second output comprises identities of objects determined by the second transformer to be represented in the second sensor data and corresponding locations of the objects in the second sensor data; and
generating, by a third transformer, a third output based upon the first output and the second output, wherein the third transformer comprises an encoder and a decoder, wherein the encoder processes the second output and the decoder, using cross-attention and self-attention, processes the first output, wherein the cross-attention correlates objects between the first output and the second output, wherein the self-attention evaluates consistency of relationships between the correlated objects, and wherein the third output comprises identities of objects determined by the third transformer to be in an environment of the system and corresponding locations of the objects in the environment of the system.

2. The system of claim 1, wherein the first sensor system is a camera and the second sensor system is a radar sensor system.

3. The system of claim 1, wherein at least one of the first sensor system or the second sensor system is a lidar system.

4. The system of claim 1, the acts further comprising:
extracting features from the first sensor data; and
providing the features and positional encodings to the first transformer, wherein the first transformer generates the first output based upon the extracted features and the positional encodings.

5. The system of claim 4, the acts further comprising:
extracting second features from the second sensor data; and
providing the second features and second positional encodings to the second transformer, wherein the second transformer generates the second output based upon the extracted second features and the second positional encodings.

6. The system of claim 1, wherein the first sensor data is an image and the second sensor data is a point cloud.

7. The system of claim 1, wherein:
the first transformer outputs the first output comprising first vectors, where each vector in the first vectors corresponds to a respective region in the first sensor data and each vector in the first vectors indicates a type of object predicted as being included in the region in the first sensor data;

the second transformer outputs the second output comprising second vectors, wherein each vector in the second vectors corresponds to a respective region in the second sensor data and each vector in the second vectors indicates a type of object predicted as being included in the region in the second sensor data; and the third transformer receives the first vectors and the second vectors as input data and outputs the third output comprising third vectors, where each vector in the third vectors corresponds to a respective region in the environment of the system and each vector in the third vectors indicates a type of object predicted as being included in the region in the environment of the system.

8. A method performed by a computing system, the method comprising:

generating, by a first transformer, a first output based upon first sensor data generated by a first sensor system, wherein the first output comprises identities of objects determined by the first transformer to be represented in the first sensor data and corresponding locations of the objects in the first sensor data, and further wherein the first sensor data is in a first modality;

generating, by a second transformer, a second output based upon second sensor data generated by a second sensor system, wherein the second output comprises identities of objects determined by the second transformer to be represented in the second sensor data and corresponding locations of the objects in the second sensor data, and further wherein the second sensor data is in a second modality; and generating, by a third transformer, a third output based upon the first output and the second output, wherein the third transformer comprises an encoder and a decoder, wherein the encoder processes the second output and the decoder, using cross-attention and self-attention, processes the first output, wherein the cross-attention correlates objects between the first output and the second output, wherein the self-attention evaluates consistency of relationships between the correlated objects, and wherein the third output comprises identities of objects determined by the third transformer to be in an environment of the first sensor system and the second sensor system and corresponding locations of the objects in the environment of the first sensor system and the second sensor system.

9. The method of claim 8, wherein the first sensor system is a camera and the second sensor system is a radar sensor system.

10. The method of claim 8, wherein at least one of the first sensor system or the second sensor system is a lidar system.

11. The method of claim 8, further comprising:

extracting features from the first sensor data; and providing the features and positional encodings to the first transformer, wherein the first transformer generates the first output based upon the extracted features and the positional encodings.

12. The method of claim 11, further comprising:

extracting second features from the second sensor data; and providing the second features and second positional encodings to the second transformer, wherein the second transformer generates the second output based upon the extracted second features and the second positional encodings.

13. The method of claim 8, wherein the first sensor data is an image and the second sensor data is a point cloud.

14. The method of claim 8, wherein:

the first transformer outputs the first output comprising first vectors, where each vector in the first vectors corresponds to a respective region in the first sensor data and each vector in the first vectors indicates a type of object predicted as being included in the region in the first sensor data;

the second transformer outputs the second output comprising second vectors, wherein each vector in the second vectors corresponds to a respective region in the second sensor data and each vector in the second vectors indicates a type of object predicted as being included in the region in the second sensor data; and the third transformer receives the first vectors and the second vectors as input data and outputs the third output comprising third vectors, where each vector in the third vectors corresponds to a respective region in the environment of the first sensor system and the second sensor system and each vector in the third vectors indicates a type of object predicted as being included in the region in the environment of the first sensor system and the second sensor system.

15. A computer-readable storage device comprising instructions that, when executed by a processor, cause the processor to perform acts comprising:

generating, by a first transformer, a first output based upon first sensor data generated by a first sensor system, wherein the first output comprises identities of objects determined by the first transformer to be represented in the first sensor data and corresponding locations of the objects in the first sensor data, and further wherein the first sensor data is in a first modality;

generating, by a second transformer, a second output based upon second sensor data generated by a second sensor system, wherein the second output comprises identities of objects determined by the second transformer to be represented in the second sensor data and corresponding locations of the objects in the first second sensor data, and further wherein the second sensor data is in a second modality; and generating, by a third transformer, a third output based upon the first output and the second output, wherein the third transformer comprises an encoder and a decoder, wherein the encoder processes the second output and the decoder, using cross-attention and self-attention, processes the first output, wherein the cross-attention correlates objects between the first output and the second output, wherein the self-attention evaluates consistency of relationships between the correlated objects, and wherein the third output comprises identities of objects determined by the third transformer to be in an environment of the first sensor system and the second sensor system and corresponding locations of the objects in the environment of the first sensor system and the second sensor system.

16. The computer-readable storage device of claim 15, wherein the first sensor system is a camera and the second sensor system is a radar sensor system.

17. The computer-readable storage device of claim 15, wherein at least one of the first sensor system or the second sensor system is a lidar system.

18. The computer-readable storage device of claim 15, the acts further comprising:

extracting features from the first sensor data; and providing the features and positional encodings to the first transformer, wherein the first transformer generates the first output based upon the extracted features and the positional encodings.

19. The computer-readable storage device of claim 18, the acts further comprising:

extracting second features from the second sensor data; and providing the second features and second positional encodings to the second transformer, wherein the second transformer generates the second output based upon the extracted second features and the second positional encodings.

20. The computer-readable storage device of claim 15, wherein:

the first transformer outputs the first output comprising first vectors, where each vector in the first vectors corresponds to a respective region in the first sensor data and each vector in the first vectors indicates a type of object predicted as being included in the region in the first sensor data;

the second transformer outputs the second output comprising second vectors, wherein each vector in the second vectors corresponds to a respective region in the second sensor data and each vector in the second vectors indicates a type of object predicted as being included in the region in the second sensor data; and the third transformer receives the first vectors and the second vectors as input data and outputs the third output comprising third vectors, where each vector in the third vectors corresponds to a respective region in the environment of the first sensor system and the second sensor system and each vector in the third vectors indicates a type of object predicted as being included in the region in the environment of the first sensor system and the second sensor system.

\* \* \* \* \*